United States Patent Office 3,165,688
Patented Jan. 12, 1965

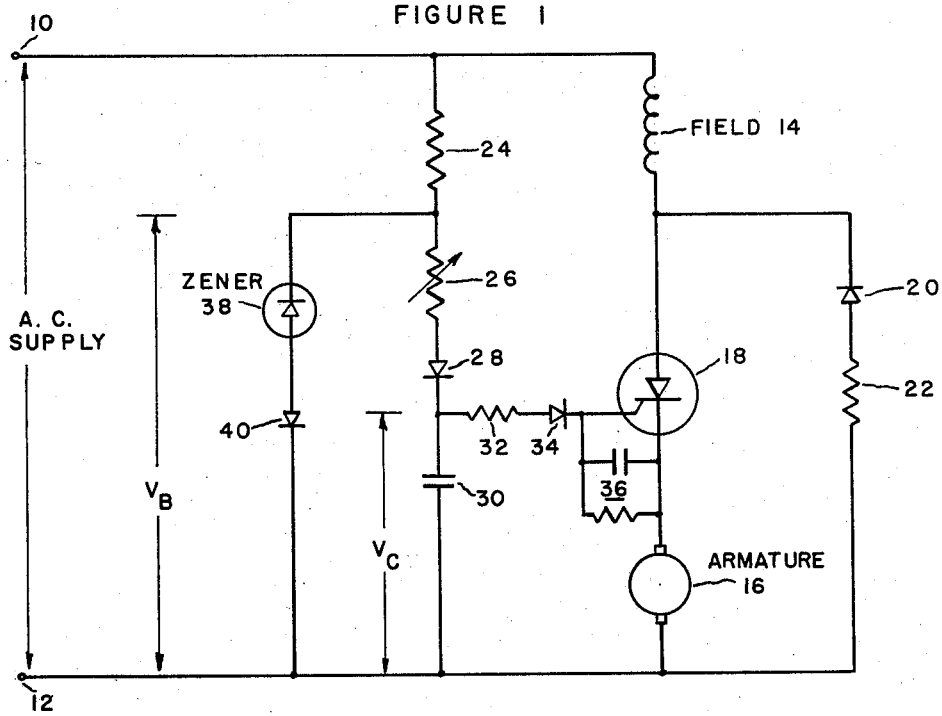
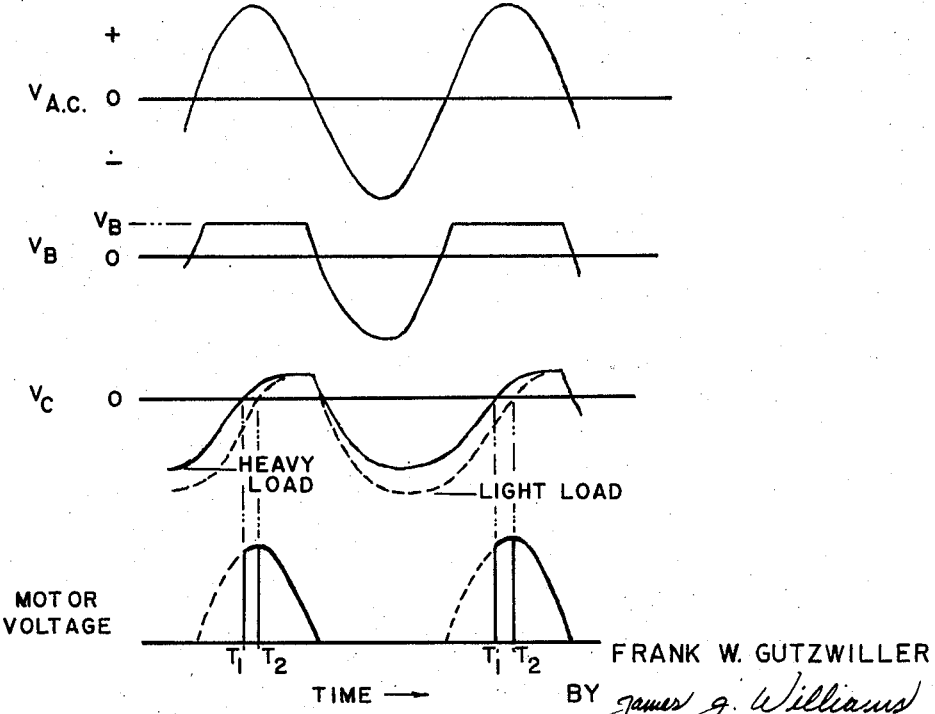

---

3,165,688
CEMF RESPONSIVE MOTOR SPEED CONTROL CIRCUIT
Frank W. Gutzwiller, Auburn, N.Y., assignor to General Electric Company, a corporation of New York
Filed Mar. 15, 1962, Ser. No. 179,964
6 Claims. (Cl. 318—246)

The invention relates to a motor control circuit, and particularly to a motor control circuit that controls the speed of a direct current motor.

Presently, many applications of electric motors not only require that the motor have a controllable speed, but also require that this speed, when selected, remain substantially constant despite changes in load on the motor. Because of these requirements, direct current motors are used with a control circuit in a great number of such applications for the purpose of providing the desired control functions and operations. It is, therefore, an object of the invention to provide a novel circuit for controlling the speed of a direct current motor.

Another object of the invention is to provide a control circuit for enabling the speed of a direct current motor to be selected and for maintaining the speed at substantially the same selected level despite changes in load on the motor.

Another object of the invention is to provide a novel circuit for controlling the speed of a direct current motor having a series field.

These and other objects are accomplished in accordance with the invention by a controlled rectifier coupled in a series circuit with the armature and field of a direct current motor, this series circuit being coupled across a source of alternating current. A second rectifier having an anode and a cathode is coupled in parallel with the anode-cathode path of the second rectifier is in the op- anodecathode path of the second rectifier is in the opposite direction relative to the anode-cathode path of the controlled rectifier. A storage or feedback capacitor is coupled in a circuit including the control electrode-cathode path of the controlled rectifier and further including the armature of the direct current motor. An adjustable or speed controlling resistor is coupled in a circuit including the control electrode-anode path of the controlled rectifier. The controlled rectifier supplies pulses of current to the motor armature and field during positive half cycles of the alternating current. The time during such positive half cycle at which the controlled rectifier conducts to supply this current is determined by the setting of the adjustable resistor and by the voltage on the storage or feedback capacitor. This voltage is, in turn, indicative of or proportional to the speed of rotation of the armature. If the speed is greater than that indicated or called for by the adjustable resistor, the controlled rectifier is made to fire or conduct at a later time, and thus supply less power. If the speed is less than that indicated or called for by the adjustable resistor, the controlled rectifier is made to fire or conduct at an earlier time and thus supply more power.

The invention will be better understood from the following description taken in connection with the accompanying drawing and its scope will be pointed out in the claims. In the drawing:

FIGURE 1 shows a circuit diagram of a preferred embodiment of the invention; and FIGURE 2 shows waveforms for explaining the operation of the diagram of FIGURE 1.

In FIGURE 1, a suitable source of alternating current potential, such as the conventional 60 cycles, 117 volts alternating current, is applied to a first terminal 10 and a second terminal 12. A direct current motor having a series field winding 14 and an armature 16 is coupled in a series circuit with the anode-cathode path of a controlled rectifier 18. The controlled rectifier 18 is of the presently well-known type such as a silicon controlled rectifier having an anode, a cathode, and a control or gate electrode. The controlled rectifier 18 is poled so that its anode-cathode current path may normally conduct current in a direction from the first terminal 10 toward the second terminal 12 when the controlled rectifier 18 is appropriately rendered conductive. A first rectifier or diode 20 and a first resistor 22 are coupled in a series circuit between the second terminal 12 and the anode of the controlled rectifier 18. The first rectifier 20 is poled in the opposite direction relative to the controlled rectifier 18. That is, the first rectifier 20 normally conducts current in a direction from the second terminal 12 toward the first terminal 10. Another series circuit comprising a second or current limiting resistor 24, an adjustable resistor 26, a second rectifier or diode 28, and a storage or feedback capacitor 30 is coupled between the first terminal 10 and the second terminal 12 as shown. The second rectifier 28 is poled in a direction such that it normally permits current to flow in a direction from the first terminal 10 to the second terminal 12. The junction of the cathode of the second rectifier 28 and the storage or feedback capacitor 30 is coupled through a series circuit including a third resistor 32 and a third rectifier or diode 34 to the control or gate electrode of the controlled rectifier 18. The main purpose of this circuit is to limit the forward current and to prevent reverse current from flowing in the gate electrode-cathode circuit of the controlled rectifier 18. A resistor-capacitor network 36 is coupled between the gate or control electrode and the cathode of the controlled rectifier 18 to stabilize the circuit by preventing the controlled rectifier 18 from being fired by extraneous signals. A Zener diode or rectifier 38 is coupled in a series circuit with a fourth rectifier or diode 40, and this series circuit is coupled between the second terminal 12 and the junction of the second resistor 24 and the adjustable resistor 26. This circuit is provided to supply the storage or feedback capacitor 30 with a substantially constant voltage for charging the storage or feedback capacitor 30 during appropriate positive half cycles.

The operation of the circuit shown in FIGURE 1 will be explained in connection with the waveforms shown in FIGURE 2. The waveforms shown in FIGURE 2 are displayed on a common time axis, and are labeled to indicate the points in the circuit of FIGURE 1 to which they apply. The waveform $V_{AC}$ represents the alternating current supply voltage between the terminals 10, 12; the waveform $V_B$ represents the voltage between the second terminal 12 and the cathode of the Zener diode 38; the waveforms $V_C$ represent voltages across the storage or feedback capacitor 30 for light and heavy loads; and the motor voltage waveform represents the voltage applied to the motor armature 16. In this discussion, a positive half cycle is that portion of an alternating current cycle when the first terminal 10 is positive with respect to the second terminal 12, and a negative half cycle is the other portion of the alternating current cycle when the second terminal 12 is positive with respect to the first terminal 10. Persons skilled in the art will recall that the armature of a direct current machine produces a counter or back electromotive force as a result of the armature winding rotating through a magnetic field. The magnitude of this counter-electromotive force is proportional to the armature speed as well as the excitation of the field through which it rotates. During a positive half cycle, the storage or feedback capacitor 30 is charged by a voltage which causes the upper terminal of the capacitor 30 to be relatively positive with respect to the lower terminal of the capacitor 30. This voltage is limited or governed by the breakdown characteristics of the Zener diode 38 so that it never exceeds the voltage $V_B$ which is indicated. The storage or feedback capacitor 30 charges from a previous condition toward this voltage with the result that its upper terminal becomes relatively positive with respect to its lower terminal. The rate of this charge depends, among other things, upon the previous condition of the capacitor 30 and the setting of the adjustable resistor 26. At some time, for example the time $T_1$, the upper terminal of the capacitor 30 becomes sufficiently positive to cause gate electrode current to flow and fire the controlled rectifier 18. At this time $T_1$, current may then flow from the upper terminal 10 through the field winding 14, the anode-cathode path of the controlled rectifier 18, and the armature 16 of the motor to the lower terminal 12 and supply appropriate power to the motor to drive it in the appropriate direction of rotation. The point in time at which the controlled rectifier 18 begins this conduction is determined by circuit characteristics, including the setting of the adjustable resistor 26 and also the speed of rotation of the armature 16. This will now be explained. During the next negative half cycle, the second terminal 12 is positive with respect to the first terminal 10. The controlled rectifier 18 is cut off or nonconductive. Because of the second rectifier 28 and the fourth rectifier 40, the circuits including these rectifiers 28, 40 do not conduct. However, the series circuit including the first rectifier 20 and the first resistor 22 is conductive, this circuit conducting current from the second terminal 12 through the first resistor 22, the first rectifier 20, and the field winding 14 to the first terminal 10. The precise point in time at which this current begins to flow depends, among other things, upon the inductive characteristics of the field winding 14. However, when this current does begin to flow, the field winding 14 is, in effect, reversely excited, and thus the armature 16 produces a counter-electromotive force which causes the upper terminal of the armature 16 to be a negative with respect to the lower terminal of the armature 16. Thus, current tends to flow from the lower terminal of the armature 16 to charge the storage or feedback capacitor 30 through a circuit including the third resistor 32, the third rectifier 34, and the gate electrode-cathode path of the controlled rectifier 18 back to the upper terminal of the armature 16. Thus, the storage or feed-back capacitor 30 receives a charge which causes its upper terminal to be relatively negative with respect to its lower terminal. This is the previous condition mentioned earlier. The amount of this charge is proportional to or indicative of the speed of rotation of the armature 16, and this charge provides a feedback signal indicative of the speed of rotation of the armature 16. As shown in waveform of FIGURE 2, a relatively large charge is provided on the storage or feedback capacitor 30 for a light load while a relatively small charge is provided on the storage or feedback capacitor 30 for a heavy load. This results from the fact that the armature is rotating relatively fast and produces a relatively large counter-electromotive force for a light load, and is rotating relatively slowly and produces a relatively small counter-electromotive force for a heavy load. The relatively light load resulting in a relatively large charge on the storage or feedback capacitor 30 retards the point in time (for example the time $T_2$) at which the controlled rectifier 18 may fire since the capacitor 30 must be charged in the opposite direction from a larger charge. As soon as the next positive half cycle begins, the capacitor 30 begins to receive a charge in the opposite direction (i.e., one in which its upper terminal is positive relative to its lower terminal), this charge depending, among other things, upon the setting of the adjustable resistor 26. Thus, the adjustable resistor 26 provides a speed control. When the capacitor receives this new charge, and when this new charge is of sufficient magnitude, it provides gate electrode current for the controlled rectifier 18 which causes the controlled rectifier 18 to fire or conduct and supply the field winding 14 and the armature 16 with energizing potential. The motor voltage waveforms show, in effect, the different amounts of this power supply, and it will be seen that a relatively early firing (time $T_1$) of the controller rectifier 18 supplies a greater amount of power than a relatively late firing (time $T_2$) of the controlled rectifier 18.

Although only one embodiment of the invention has been shown and explained, it is to be understood that many modifications of the circuit of FIGURE 1 may be made. For example, the Zener diode 38 and the fourth rectifier 40 may be omitted, as may also the third rectifier 34 and the resistor-capacitor network 36. And although the invention has been described with reference to a particular embodiment, it is to be understood that modifications may be made by persons skilled in the art without departing from the spirit of the invention or from the scope of the claims.

What I claim as new and desire to secure by Letters Patent of the United States is:

1. A speed control circuit for a direct current motor having an armature and a field, comprising a controlled rectifier having an anode, a cathode, and a control electrode, means coupling said armature, said field, and the anode-cathode path of said controlled rectifier in a series circuit, a second rectifier having an anode and a cathode, means coupling said second rectifier in parallel with said anode-cathode path of said controlled rectifier so that the anode-cathode path of said second rectifier is in the opposite direction relative to said anode-cathode path of said controlled rectifier, a capacitor coupled in a circuit including the control electrode-cathode path of said controlled rectifier and further including said armature, and an impedance element coupled in a circuit including the control electrode-anode path of said controlled rectifier.

2. A speed control circuit for a direct current motor having an armature and a field, comprising a controlled rectifier having an anode, a cathode, and a control electrode, means coupling said armature, said field, and the anode-cathode path of said controlled rectifier in a series circuit, a second rectifier having an anode and a cathode, means coupling said second rectifier in parallel with said anode-cathode path of said controlled rectifier so that the anode-cathode path of said second rectifier is in polarity opposition to said anode-cathode path of said controlled rectifier and so that said field is reversely excited by current flow through said second rectifier, a capacitor coupled in a series circuit including the control electrode-cathode path of said controlled rectifier and further including said armature, and an adjustable impedance element coupled in a series circuit including the control electrode-anode path of said controlled rectifier.

3. A speed control circuit for a direct current motor having an armature and a field, comprising a controlled rectifier having an anode, a cathode, and a control electrode, means coupling said armature, said field, and the anode-cathode path of said controlled rectifier in a series circuit between first and second terminals with said anode-cathode path of said controlled rectifier being poled to permit current to flow in a direction from said first terminal toward said second terminal, a second rectifier having an anode and a cathode, means coupling said second rectifier in parallel with said anode-cathode path of said controlled rectifier with said anode-cathode path of said second rectifier being coupled to permit current to flow in a direction from said second terminal toward said first terminal and reversely excite said field, a capacitor coupled in a series circuit including at least the control electrode-cathode path of said controlled rectifier and said armature, and an adjustable resistor coupled in a series circuit including at least the control electrode-anode path of said controlled rectifier.

4. A speed control circuit for a direct current motor having an armature and a field, comprising a controlled rectifier having an anode, a cathode, and a control electrode, means coupling said armature, said field, and the anode-cathode path of said controlled rectifier in a series circuit between first and second terminals with said anode-cathode path of said controlled rectifier being poled to permit current to flow in a direction from said first terminal toward said second terminal, a second rectifier having an anode and a cathode, means coupling said cathode of said second rectifier to said series circuit between said anode of said controlled rectifier and said first terminal, means coupling said anode of said second rectifier to said series circuit to permit current to flow through said field in a direction from said second terminal toward said first terminal, a capacitor coupled in a series circuit including at least the control electrode-cathode path of said controlled rectifier and including said armature, a third rectifier having an anode and a cathode, an adjustable resistor, and means coupling said third rectifier and said adjustable resistor in a series circuit including at least the control electrode-anode path of said controlled rectifier.

5. A speed control circuit for a direct current motor having an armature and a field, comprising a controlled rectifier having an anode, a cathode, and a control electrode, means coupling said armature, said field and the anode-cathode path of said controlled rectifier in a series circuit between first and second terminals with said anode-cathode path of said controlled rectifier being poled to permit current to flow in a direction from said first terminal toward said second terminal, a second rectifier having an anode and a cathode, means coupling said cathode of said second rectifier to said series circuit at a point between said anode of said controlled rectifier and said first terminal, means coupling said anode of said second rectifier to said series circuit at a point to permit current to flow through said field in a direction from said second terminal toward said first terminal, a capacitor coupled betwen said second terminal and said control electrode of said controlled rectifier, a third rectifier having an anode and a cathode, an adjustable resistor, means coupling said third rectifier and said adjustable resistor in a series circuit between said first terminal and said control electrode of said controlled rectifier, said third rectifier being poled to permit current to flow in a direction from said first terminal toward said control electrode of said controlled rectifier, and means for supplying energizing potential to said first and second terminals.

6. A speed control circuit for a direct current motor having an armature and a field, comprising a controlled rectifier having an anode, a cathode, and a control electrode, means coupling said armature, said field, and the anode-cathode path of said controlled rectifier in a series circuit between first and second terminals with said anode-cathode path of said controlled rectifier being poled to permit current to flow in a direction from said first terminal toward said second terminal, a second rectifier having an anode and a cathode, means coupling said cathode of said second rectifier to said series circuit at a point between said anode of said controlled rectifier and said first terminal, means coupling said anode of said second rectifier to said series circuit at a point to permit current to flow through said field in a direction from said second terminal toward said first terminal, a capacitor coupled between said armature and said control electrode of said controlled rectifier, a third rectifier having an anode and a cathode, an adjustable resistor, means coupling said third rectifier and said adjustable resistor in a series circuit between said first terminal and said control electrode of said controlled rectifier, said third rectifier being poled to permit current to flow in a direction from said first terminal toward said control electrode of said controlled rectifier, and means for supplying energizing potential to said first and second terminals.

References Cited by the Examiner
UNITED STATES PATENTS

| | | | |
|---|---|---|---|
| Re. 25,203 | 7/62 | Momberg et al. | 318—345 X |
| 2,905,876 | 9/59 | Hillman | 318—331 X |
| 2,981,880 | 4/61 | Momberg et al. | 318—345 X |

ORIS L. RADER, *Primary Examiner*.

UNITED STATES PATENT OFFICE
CERTIFICATE OF CORRECTION

Patent No. 3,165,688                        January 12, 1965

Frank W. Gutzwiller

It is hereby certified that error appears in the above numbered patent requiring correction and that the said Letters Patent should read as corrected below.

Column 1, line 36, after "the", first occurrence, insert -- controlled rectifier so that the anode-cathode path of the --; line 37, strike out "anodecathode path of the second rectifier is in the op-"; column 3, line 38, strike out "a"; line 52, after "in" insert -- the --; column 5, line 36, for "betwen" read -- between --.

Signed and sealed this 22nd day of June 1965.

(SEAL)
Attest:

ERNEST W. SWIDER
Attesting Officer

EDWARD J. BRENNER
Commissioner of Patents